United States Patent [19]

Watanabe et al.

[11] Patent Number: 4,942,950
[45] Date of Patent: Jul. 24, 1990

[54] METHOD AND APPARATUS FOR CONTROLLING AN ELECTROMAGNETIC CLUTCH FOR USE ON A VEHICLE

[75] Inventors: Tomoyuki Watanabe; Setsuo Tokoro; Takashi Hayashi; Takashi Shigematsu, all of Susono, Japan

[73] Assignee: Toyota Jidosha Kabushiki Kaisha, Japan

[21] Appl. No.: 442,401

[22] Filed: Nov. 27, 1989

Related U.S. Application Data

[63] Continuation of Ser. No. 273,623, Aug. 25, 1988, abandoned, which is a continuation of Ser. No. 56,877, Jun. 3, 1987, abandoned, which is a continuation-in-part of Ser. No. 797,693, Nov. 13, 1985, abandoned.

[30] Foreign Application Priority Data

Nov. 15, 1984 [JP] Japan .................................. 59-241079

[51] Int. Cl.$^5$ .............................................. B60K 41/02
[52] U.S. Cl. ............................ 192/0.096; 192/103 C; 180/197; 364/426.03
[58] Field of Search ............... 192/0.033, 0.075, 0.076, 192/0.096, 21.5, 103 R, 103 C, 103 F; 180/197; 364/426.03

[56] References Cited

U.S. PATENT DOCUMENTS

| 3,863,730 | 2/1975 | Wakamatsu et al. | 180/197 |
| 3,982,509 | 9/1976 | Colling et al. | 180/197 |
| 4,344,499 | 8/1982 | van der Lely et al. | 180/197 |
| 4,403,683 | 9/1983 | Takano | 192/21.5 |
| 4,509,625 | 4/1985 | Tellert | 192/0.033 |
| 4,558,414 | 12/1985 | Sakakiyama | 180/197 |
| 4,620,420 | 11/1986 | Gloss et al. | 180/197 |
| 4,796,718 | 1/1989 | Thielen et al. | 192/0.076 |

FOREIGN PATENT DOCUMENTS

| 59-202963 | 11/1984 | Japan | 192/0.096 |
| 989119 | 4/1965 | United Kingdom | 192/103 R |

Primary Examiner—Richard Lorence
Attorney, Agent, or Firm—Oliff & Berridge

[57] ABSTRACT

Method and apparatus for controlling an electromagnetic clutch which is incorporated in a power transmission system of a vehicle to transmit a torque of an engine to drive wheels, when the vehicle is started on a road surface having a low coefficient of friction. The method or apparatus comprises: a step or device for increasing progressively a transmission torque which is transmitted by the electromagnetic clutch; a step or device for detecting a slip of the drive wheels on the road surface; and a step or device for reducing, upon detection of the slip of the drive wheels, the transmission torque of the electromagnetic clutch until the drive wheels have ceased to slip on the road surface.

8 Claims, 4 Drawing Sheets

# METHOD AND APPARATUS FOR CONTROLLING AN ELECTROMAGNETIC CLUTCH FOR USE ON A VEHICLE

This is a continuation of application Ser. No. 07/237,623 filed 8/25/88, now abandoned, which in turn is a continuation of Ser. No. 07/056,877 filed 6/3/87, now abandoned, which in turn is a continuation-in-part of 06/797,693 filed 11/13/85, now abandoned.

BACKGROUND OF THE INVENTION

The present invention relates generally to a method and an apparatus for controlling an electromagnetic clutch for use on a vehicle. More particularly, the invention is concerned with improved technologies for controlling an engaging action of such an electromagnetic clutch so as to permit a smooth start of the vehicle on a slippery road surface having a relatively low coefficient of friction.

In the art of a power transmission system of a vehicle, an electromagnetic clutch is used as means for easy control of a torque to be transmitted. For controlling an engaging action of the clutch, an electric current or voltage to be applied to energize a coil of the clutch is controlled according to a control program which is predetermined for maximum drivability and fuel economy of the vehicle at the time of its start. For example, the electric current or voltage to energize the coil of the electromagetic clutch is controlled in proportion to a difference between an idling speed of an engine of the vehicle and a driving speed of the engine. A coefficient of the proportion of the current or voltage to the difference in speed is constant, or determined as a function of an opening angle of a throttle valve of the engine, or other variables. An example of the above-indicated control is disclosed in Japanese Patent Application No. 58-131685 which was laid open on Feb. 6, 1985 under Publication No. 60-23639, which was assigned to the same assignee as the present application.

Such a known method of controlling the electromagnetic clutch as indicated above is practiced on the assumption that the road surface on which the vehicle is driven has a normal coefficient of friction. Accordingly, the known method suffers difficulty in starting the vehicle due to slippage of its drive wheels on the road surface, when the road surface has a very low coefficient of friction, e.g., when starting the vehicle on a frozen or sandy road surface or other slippery road surfaces.

SUMMARY OF THE INVENTION

It is accordingly an object of the present invention to provide a method and an apparatus for controlling an electrolmagnetic clutch for a vehicle, which are capable of controlling an engaging action of the clutch so as to allow a smooth start of the vehicle without a slip even on a road surface having a very low coefficient of friction.

According to the invention, there is provided a method of controlling an electrolmagnetic clutch which is incorporated in a power transmission system of a vehicle to transmit a torque of an engine to drive wheels, when the vehicle is started on a road surface having a low coefficient of friction, the method comprising the steps of:

increasing gradually a tranmission torque which is tranmitted by the electromagnetic clutch;

detecting a slip of said drive wheels on the road surface; and, upon detection of the slip of the drive wheels, reducing the transmission torque of the electromagnetic clutch until the drive wheels have ceased to slip on the road surface.

In the controlling method of the invention as described above, the transmission torque of the electromagnetic clutch is gradually increased at the time of a start of the vehicle on a road surface having a low coefficient of friction. When a slip of the drive wheels is detected, the transmission torque is reduced until the drive wheels have ceased to slip. Therefore, the electrolmagnetic clutch is controlled so that the drive wheels are driven with a maximum permissible torque which does not cause a slip of the drive wheels. Thus, the instant controlling method permits an automatic control of the transmission torque of the electromagnetic clutch for easy starting of the vehicle without a slip of the drive wheels, even on a slippery road surface having a low coefficient of friction.

According to the invention, there is also provided an apparatus suitable for practicing the method of the invention described above, including a coil to be energized for an engaging action of the electrolmagnetic clutch to transmit a torque of the engine to the drive wheels, the torque to be transmitted by the clutch being varied as a function of an electric current or voltage to energize the coil, the apparatus comprising: (1) road-condition designating means for indicating that a road surface on which the vehicle is driven has a low coefficient of friction; (2) slip-detecting means for detecting a slip of the drive wheels on said road surface; and (3) control means for increasing gradually the electric current or voltage while the road-condition designating means indicates that the road surface has a low coefficient of friction, the control means reducing gradually the electric current or voltage, upon detection of the slip by the slip-detecting means, until the drive wheels have ceased to slip on the road surface.

In the controlling apparatus of the invention constructed as described above, when the road surface on which the vehicle is driven has a low coefficient of friction, the electric current or voltage to be applied to the coil of the electromagnetic clutch is gradually increased until the drive wheels start to slip on the road surface. When a slip of the drive wheels is detected, the electric current or voltage is gradually reduced until the drive wheels have ceased to slip on the road surface. Therefore, the instant controlling apparatus permits an easy and smooth start of the vehicle even on a slippery road surface, as previously described in connection with the controlling method of the invention.

According to an advantageous embodiment of the apparatus of the invention, the slip-detecting means detects the slip of the drive wheels when an acceleration of the drive wheels exceeds a predetermined value. According to a preferred form of this embodiment, the slip-detecting means comprises: setting means for setting a time or angular interval sufficient for accurate detection of the acceleration of the drive wheels; means for calculating a variation in rotating speed of the drive wheels at the time or angular interval set by the setting means; and means for comparing the calculated variation with a predetermined value.

According to a further embodiment of the invention, the control means reduces the electric current or voltage at a rate lower than a rate at which the electric current or voltage is increased.`

According to a still further embodiment of the invention, the controlling apparatus further comprises: means for detecting a running speed of the vehicle and comparing the detected running speed with a first predetermined value; means for detecting a currently required output of the engine and comparing the detected currently required output with a second predetermined value; and means for detecting a difference in rotating speed between an input shaft and an output shaft of the electromagnetic clutch and comparing detected difference with a third predetermined value. The control means increases gradually the electric current or voltage, and reduces gradually the electric current or voltage until the drive wheels have ceased to slip on the road surface, provided that the detected running speed of the vehicle is lower than the first predetermined value, with the detected currently required output of the engine being greater than the second predetermined value, while at the same time the detected difference in rotating speed between the input and output shafts of the clutch is greater than the third predetermined value.

BRIEF DESCRIPTION OF THE DRAWINGS

The above and other objects, features and advantages of the present invention will become more apparent from reading the following description of the preferred embodiment taken in conjunction with the accompanying drawings in which.

DETAILED DESCRIPTION OF THE PREFERRED EMBODIMENT

The present invention will be described in detail referring to the accompanying drawings illustrating one preferred embodiment of the invention.

Figure 1:
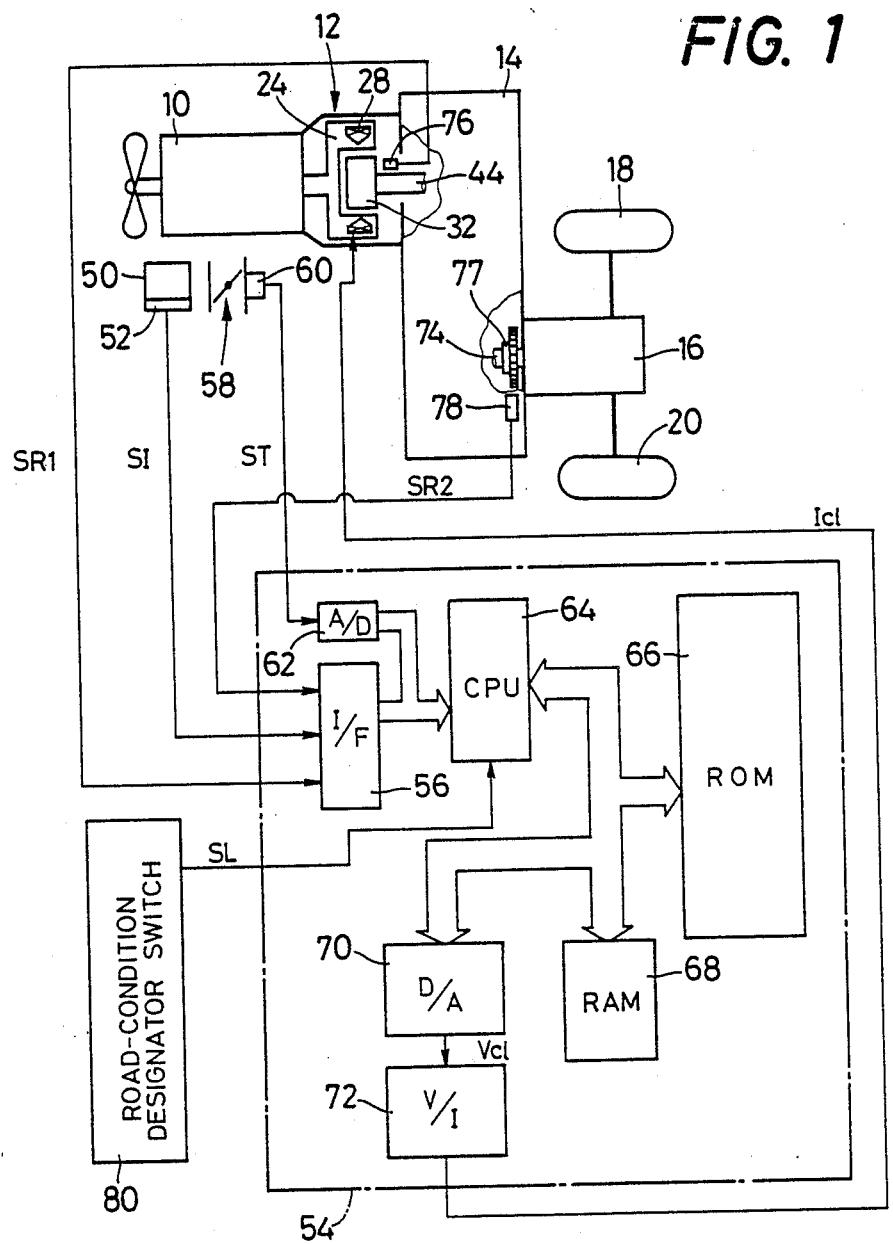
FIG. 1 is a schematic illustration of a power transmission system which incorporates an electromagnetic clutch of the magnetic powder type and one embodiment of an apparatus of the invention for controlling the electromagnetic clutch.

There is shown in FIG. 1 an engine 10 of an automotive vehicle, an output torque of which is transmitted to drive wheels 18, 20 via an electrolmagnetic clutch 12 of the magnetic power type, a transmission 14 may be a manual-shift transmission or an automatic continuously variable transmission (so-called "CVT") of the belt-and-pulley type.

Figure 2:
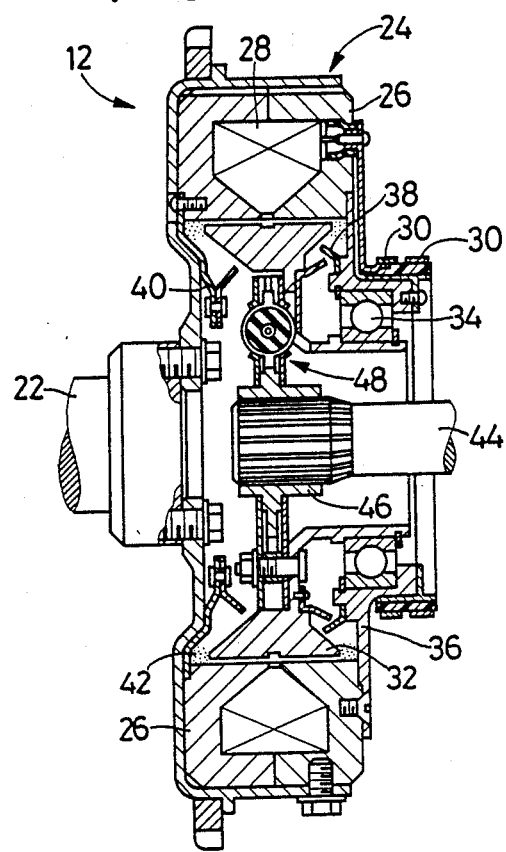
FIG. 2. is an elevational view in cross section of the electromagnetic clutch of FIG. 1.
Figure 3:
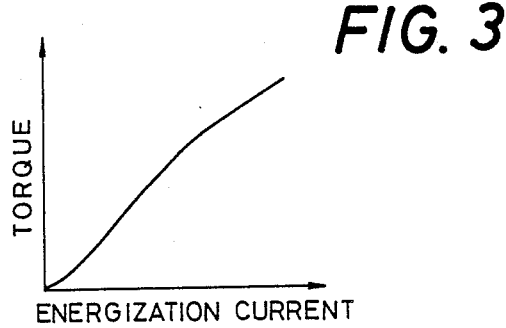
FIG. 3 is a graphical representation of commonly known characteristics of the electromagnetic clutch of FIG. 2.

The electromagnetic clutch 12 is capable of adjusting a torque to be transmitted thereby. The construction of the electromagnetic clutch 12 is illustrated in detail in FIG. 2, wherein the clutch 12 comprises a flywheel 24 which is fixed to an end of a crank shaft 22 of the engine 10. The flywheel 24 is provided with an annular yoke 26. The clutch 12 further comprises an annular clutch coil 28 which is embedded in a radially central part of the annular yoke 26, as seen in a cross sectional view of FIG. 2. The coil 28 is suppied with an electric current through brushes (not shown) and a slip ring 30 which rotates with the yoke 26. Radially inward of the yoke 26, there is disposed a rotor 32 which is rotatably supported by a first labyrinth member 36 via a bearing 34. The first labyrinth member 36 is secured to one longitudinal end of the annular yoke 26, and is equipped with an annular closure labyrinth 38. To the other longitudinal end of the annular yoke 26, there is secured a second labyrinth member 40 which cooperates with the first labyrinth member 36, the annular yoke 26 and the rotor 32 to define a substantially enclosed annular space for accommodating a mass of magnetic powder 42. Thus, the first and second labyrinth members 36, 40 serve to prevent the magnetic powder mass 42 from being discharged out of an annular gap defined by the rotor 32 and the yoke 26. Upon energization of the coil 8, a magnetic field is formed so as to produce a magnetic force which causes particles of the magnetic powder mass 42 to be tightly bonded together. As a result, the powder mass 42 contacts the inner and outer surfaces of the yoke and rotor 26, 32 thereby transmitting a torque from the crankshaft 22 to an output shaft 44 of the clutch 12, according to a torque-current curve shown in FIG. 3. The output shaft 44 is connected at its end to a hub 46 by means of a spline. The hub 46 is coupled to the rotor 32 via a damper 48 which is provided to absorb or commodate a shock upon engagement of the rotor 32 with the hub 46. The output shaft 44 of the electromagnetic clutch 12 serves as an input shaft of the previously indicated transmission 14.

Referring back to FIG. 1, an ignition system 50 for the engine 10 is provided with an ignition timing sensor 52 which produces an IGNITION signal SI in the form of pulses whose number corresponds to an actual running speed of the engine 10. Adjacent to the output shaft 44 of the electrolmagnetic clutch 12, and to an output shaft 74 of the transmission 14, there are disposed a first and a second speed sensor 76, 78 which generate ROTATION signals SR1 and SR2 representing rotating speeds of the output shafts 44, 74, respectively. These ROTATION signals SR1 and SR2 are also applied to the I/F circuit 56. The output shaft 74, which is rotated at a comparatively low speed, has a speed detecting gear 77 formed on its periphery. The second speed sensor 78 detects the rotating speed of the output shaft 74 by sensing the passage of teeth of the gear 77. A throttle valve 58 is disposed in an intake manifold of the engine 10. The throttle valve 59 is provided with a throttle position sensor 60 which generates a THROTTLE signal ST indicating an opening angle θ of the throttle position sensor 60. The THROTTLE signal ST is fed to an A/D converter 62 in the controller 54. Based on the IGNITION signal S1, ROTATION signal SR1 and ROTATION signal SR2, the I/F circuit 56 produces coded signals which represent an ignition interval "tig" of the engine 10, a rotating interval "tin" of the output shaft 44 of the clutch 12 (input shaft of the transmission 14), and a rotating interval "tout" of the output shaft 74 of the transmission 14.

The controller 54 is constituted by a microcomputer, which comprises a central processing unit (hereinafter referred to as "CPU") 64, a read-only memory (hereinafter called "ROM") 66, a random-access memory (hereinafter called "RAM") 68, and a D/A converter 70. The CPU 64 receives a ROAD-CONDITION signal SL which is generated from a ROAD-CONDITION designator switch 80, which serves as means for designating a slippery condition of a road surface on which the vehicle in question is driven. This designator switch 80 is used to effect a special control of the electromagnetic clutch 12, according to the concept of the invention, at the time of start of the vehicle where the road surface has an especially low coefficient of friction. According to programs stored in the ROM 66, the CPU 64 processes data which is received from the A/D converter 62 and the I/F circuit 56, and determines and amount of electric current or a level of voltage to be applied to the electromagnetic clutch 12. More specifically, the CPU 64 applies a control voltage Vcl to a V/I converter 72 via the D/A converter 70, based on the determined current or voltage. The V/I converter 72 is a constant-current device which applies to the electromagnetic clutch 12 an energization current Ic1 corresponding to the received control voltage Vcl.

Figure 4A:
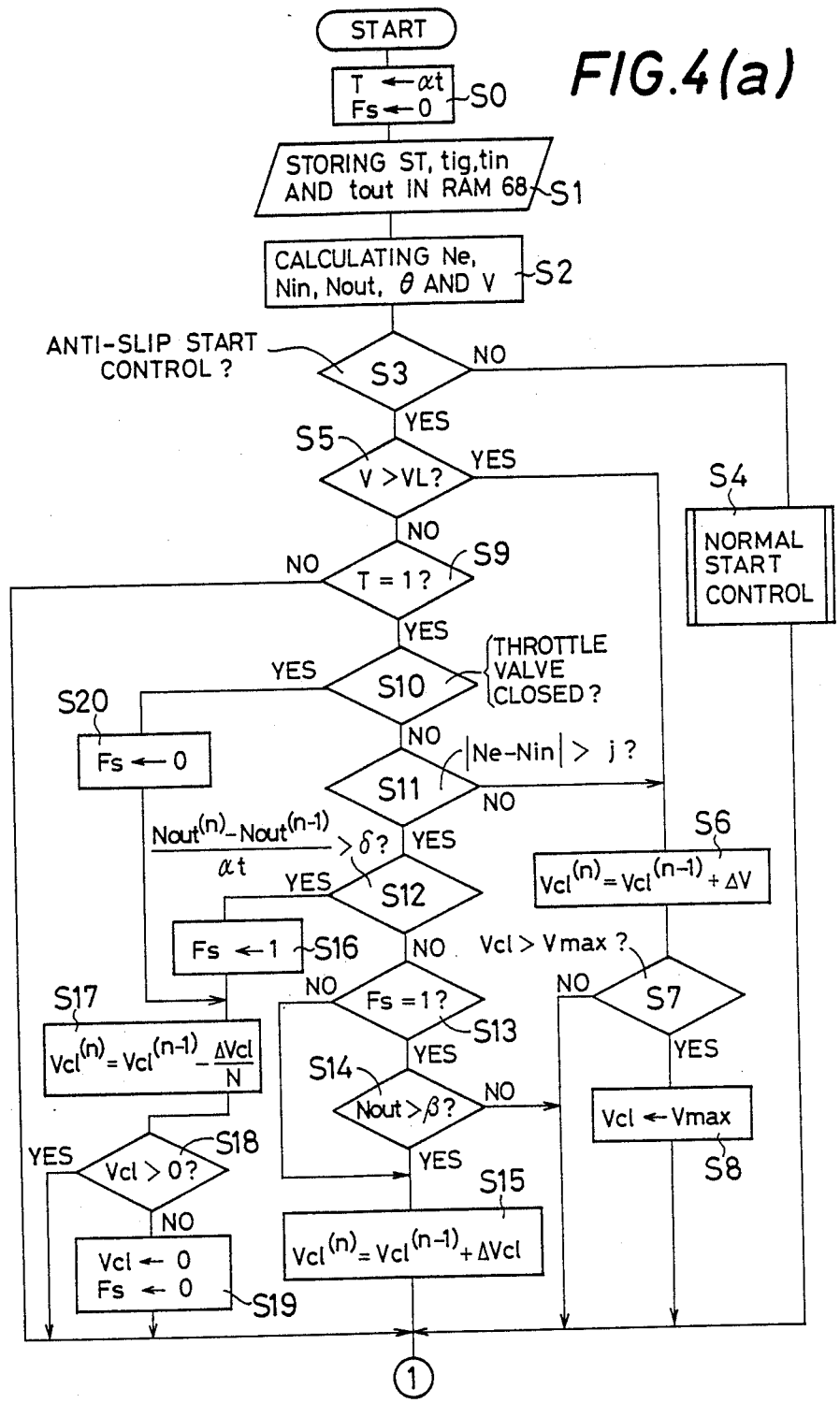
FIGS. 4(a) and 4(b) are flow charts illustrating the operation of the controlling apparatus of the invention of FIG. 1.
Figure 4B:
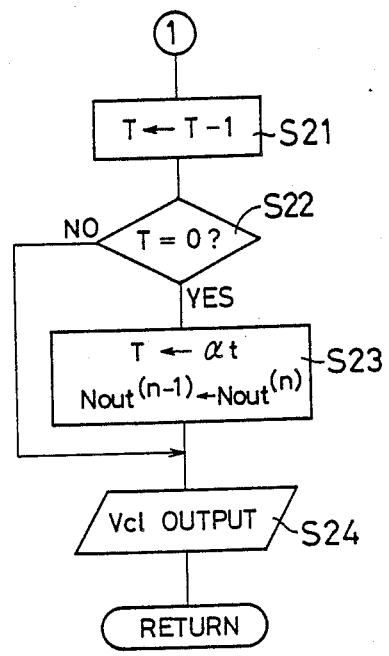

The operation of the controlling apparatus constructed as discussed hitherto will be described with reference to the flow chart of FIG. 4.

At first, the CPU 64 executes an initializing step S0 in which a predetermined value "$\alpha t$" is set in a counter T (which will be described), and a SLIP flag Fs (which will be described) is reset to "0". Then, the CPU 64 executes step S1 to store in the RAM 68 the THROTTLE signal ST, and the intervals "tig", "tin" and "tout". Step S1 is followed by step S2 wherein the running speed Ne of the engine 10, rotating speed Ni of the input shaft 44 of the transmission 14, rotating speed Nout of the output shaft 74 of the transmission 14, running speed V of the vehicle, and opening angle $\theta$ of the throttle valve 58 are calclated based on the stored intervals "tig", "tin", "tout", and the THROTTLE signal ST, and according to the following formulas:

$$Ne \text{ (r.p.m.)} = 1/\text{"tig"} \times 180°/360° \times 60 \text{ sec.} \quad (1)$$

$$Ni \text{ (r.p.m.)} = 1/\text{"tin"} \times 360°/360° \times 60 \text{ sec.} \quad (2)$$

$$Nout \text{ (r.p.m.)} = 1/\text{"tout"} \times 1/n \times 60 \text{ sec.} \quad (3)$$

where, n: number of teeth of the speed detecting gear 77

$$V \text{ (Km/h)} = Nout \times 1/Rdef \times 2\pi rD \times 60 \text{ min.} \times 1/1000 \quad (4)$$

where,
Rdef: gear ratio of the final drive unit 16
rD: radius of the drive wheels 18, 20

$$\theta(\%) = \frac{V\theta - Vmin}{Vmax - Vmin} \times 1000 \quad (5)$$

where,
$V\theta$: voltage represented by the THROTTLE signal ST
Vmin: voltage when the throttle valve 58 is fully closed
Vmax: voltage when the throttle valve 58 is fully open In the next step S3, the CPU 64 judges, based on the ROAD-CONDTION signal SL, whether the ROAD-CONDITION designator switch 80 is set in an anti-slip control position, i.e., whether an anti-slip control should be effected, or not. If the CPU 64 judges that the anti-slip control should not be effected the CPU 64 goes to step S4 for a normal start control of the vehicle. In this normal start control, the control voltage Vcl is determined according to the following formula (6):

$$Vcl = K(Ne - NIdl) \quad (6)$$

where,
Nidl: idling speed of the engine 10
K: control constant determined by parameters such as the opening angle $\theta$ of the throttle valve 58

In the case where the judgement in step S3 reveals that the anti-slip control is required, the CPU 64 goes to stip S5 to check if the current running speed V of the vehicle is higher than a predetermined level VL. This level VL is selected to be such a low level that it does not require a gradual reduction in transmission torque of the electromagnetic clutch 12 to prevent a slip of the drive wheels 18, 20 on the road surface even when the coefficient of friction of the road surface is extremely low. If the current running speed V of the vehicle is higher than the predetermined threshold level VL, step S5 is followed by step S6 wherein the control voltage Vcl is gradually increased. Described in more detail, a predetermined increment $\Delta V$ is added to the last control voltage $Vcl^{(n-1)}$ each time the CPU 64 executes a control cycle. Then, the CPU 64 goes to step S7 to check if the present control voltage Vcl exceeds the predetermined upper limit Vmax. If not, the CPU 64 skips the next step S8. If the present control voltage Vcl has exceeded the upper limit Vmax, the step S8 is executed and the control voltage Vcl is fixed at the upper limit Vmax.

In the case where the judgment in step S5 reveals that the running speed V is not higher than the predetermined value VL, the CPU 64 executes step S9 to check if the current content of the counter T is one or not. This counter T is a decrement counter constituted by a program executed by the CPU 64, which decrement counter T acts as means for setting an interval of calculating an acceleration of the output shaft 74 of the transmission 14 (i.e., acceleration of the drive wheels 18, 20). This time interval is determined so as to allow a time sufficient to permit accurate or reliable detection of the acceleration of the output shaft 74. If the checking in step S9 indicates that the content of the couter T is not one (1), the CPU 64 goes to step S21 which will be described. If it is found that the content of the counter T is one (1), step S10 and the subsequent steps will be executed. In step S10, the CPU 64 checks if the throttle valve 58 is closed or not. If the valve 58 is closed, that is, if an accelerator pedal of the vehicle is not depressed, step S20 is executed to reset a SLIP flag Fs, and then step S17 and the subsequent steps will be executed. If the judgment in step S10 reveals that the opening angle $\theta$ of the throttle valve 58 representing a currently required output of the engine 10 is greater than a predetermined small value (if the valve 58 is not closed), step S10 is followed by step S11 to check if an absolute value of a difference between the speed Ne of the input shaft of the clutch 12 (speed of the engine 10) and the speed Nout of the output shaft 44 is greater than a predetermined value "j", or not. This value "j" is a maximum value of calculation error of the microcomputer. Accordingly, if the absolute value of the above difference is smaller than the value "j", the CPU 64 judges that the electrolmagnetic clutch 12 is fully engaged. If the absolute value is greater than the value "j", on the other hand, the CPU 64 judges that the electromagnetic clutch 12 is in partial engagement. In the case where the judgment in step S11 indicates the full engagement of the clutch 12, the previously described steps S6-S8 are executed, whereby the control voltage Vcl is gradually increased until it reaches the upper limit Vmax. If the judgment in step S11 indicates the partial engagement of the clutch 12, step S12 is executed to obtain and acceleration $[(Nout^{(n)} - Nout^{(n-1)})/\alpha t]$ by calculating a difference between the speed $Nout^{(n-1)}$ of the output shaft 74 in the last cycle, and the current speed $Nout^{(n)}$ in the present cycle, that is, a variation in the rotating speed Nout during the present time interval $\alpha t$. the obtained difference is comared with a predetermined upper limit (reference value) $\delta$, which is a maximum acceleration value that does not cause a slip of the drive wheels 18, 20 on the road surface. If the obtained acceleration is larger than the upper limit $\delta$, the CPU 64 judges that there exists a slip of the drive wheels 18, 20. If the obtained acceleration is not larger than the upper limit, the CPU 64 judges that the drive wheels 18, 20 are not slipping on the road surface, and goes to step S13 to check if the SLIP flag Fs is established or not (if the flag fs is set at "1"). This step S13 is provided to see if a slip of the drive wheels 18, 20 has occurred in a previous cycle, though it is found that no slip is detected in the current cycle. The speeds $Nout^{(n)}$ and $Nout^{(n-1)}$ compared in step S12 are updated at the interval determined by the value $\alpha t$ present in the counter T in the initializing step S0 and in step S23 as described later. Thus, the CPU 64 checks for the presence of a slip of the drive wheels 18, 20, at the interval determined by the setting $\alpha t$ of the counter T. Accordingly, the counter T and means for executing the step S12 cooperate to serve as slip-detecting means for detecting a slip of the drive wheels 18, 20 on the road surface.

If the judgment in step S13 is affirmative, that is, if there existed a slip of the drive wheels 18, 20, step S13 is followed by step S14 in which the CPU 64 checks if the speed Nout of the output shaft 74 corresponding to the vehicle speed V is higher than a predetermined speed $\beta$, or not. If the speed Nout has exceeded the predetermined value $\beta$, the CPU 64 judges that although there was a slip of the drive wheels 18, 20 it is possible to continue to accelerate the vehicle speed V. Consequently, step S14 is followed by step S15 in which a new control voltage $Vcl^{(n)}$ is obtained by adding a predetermined increment value $\Delta Vcl$ to the last control voltage $Vcl^{(n-1)}$. If the speed Nout of the output shaft 74 is not higher than the predetermined value $\beta$, the above-indicated step S15 is skipped and the control voltage Vcl is left unchanged, because the addition of the increment value $\Delta Vcl$ may possible cause the drive wheels 18, 20 to slip again. Therefore, the value $\beta$, is a lower limit speed of the output shaft 74 at which it is possible to increment the control voltage $Vcl^{(n)}$ in the current control cycle without causing a slip of the drive wheels, 18, 20. In the case where the judgment in step S13 indicates that the SLIP flag Fs is not set at "1", namely, if a slip of the drive wheels 18, 20 was not detected in the preceding cycle, the CPU 64 skips the step S14, and the control voltage Vcl is inceased by the increment value $\Delta Vcl$.

In the case where the judgment in step S12 indicates that there exists a slip of the drive wheels 18, 20, step S12 is followed by step S16 in which the SLIP flag Fs is set to "1", and by step S17 wherein the control voltage Vcl is decremented. More specifically, a predetermined decrement value Vcl/N is subtracted from the last control voltage $Vcl^{(n-1)}$. Thus, the steps S12 through S17 correspond to control means for controlling the control voltage Vcl at the time of start of the vehicle when the coefficient of friction of the road surface is low (when the ROAD-CONDITION designator switch 80 is set in the anti-slip control position). Since N is an integer, a rate of reduction in the control voltage Vcl in step S17 in smaller than a rate of increase in the control voltage Vcl in step S15. This arrangement permits fine adjustment of the control voltage Vcl just below a threshold level beyond which the drive wheels 18, 20 start to slip. Step S17 is followed by step S18 to check if the control voltage Vcl is larger than zero. If the result of the checking is affirmative, the next step S19 is skipped. If the control voltage Vcl is not larger than zero, the step S19 is executed to zero the control voltage Vcl and reset the SLIP flag Fs to "0". In summary, if a slip of the drive wheels 18, 20 is detected in step S12, step S16 and the subsequent steps are repeatedly executed, whereby the control voltage Vcl is gradually reduced until the drive wheels 18, 20 have ceased to slip or until the control voltage Vcl has been reduced to zero.

After the control voltage Vcl has been determined as described hitherto, step S21 is implemented to decrement the content of the counter T. Subsequently, step S22 is executed to check if the content of the counter T has been zeroed or not. If the checking in step S22 reveals that the content of the counter T has not been reduced to zero, the CPU 64 skips the previously indicated steps S10 through S20 and step S23, and goes to step S24 in which the determined control voltage Vcl is applied to the V/I converter 72 through the D/A converter 70, until the control voltage Vcl is newly determined. Then, the control returns to step S1. Thus, a degree of engagement of the electromagnetic clutch 12 is controlled according to the control voltage Vcl, and the torque of the engine 10 is accordingly transmitted by the clutch 12. When the checking in step S22 reveals that the content of the counter T has been zeroed, the counter T is loaded with the value $\alpha t$, and the speed $Nout^{(n)}$ of the output shaft 74 determined in the current cycle is set as the last speed $Nout^{(n-1)}$ for the next cycle. The value $\alpha t$ to be set in the counter T is determined to be larger than a period of the Vcl control cycle, in order to accurately sense the rotating speed of the output shaft 74, and to assure reliable and exact detection of a slip of the drive wheels 18, 20. In other words, the control cycle time is too short to allow enough time for accurate detection of a slip of the drive wheels.

In the present embodiment of the controlling apparatus of the invention which has been described hitherto, steps S12-S15 are executed to gradually increase the torque transmitted by the electromagnetic clutch 12, at a rate lower than that in the coinventional controlling apparatus, while the ROAD-CONDITION designator switch 80 is set in the anti-slip control position. If a slip of the drive wheels 18, 20 is detected in step S12, the transmission torque of the clutch 12 is reduced in step S17 without reducing the opening of the throttle valve 58 until the slip becomes absent. The transmission torque is maintained at this reduced level. When the vehicle speed is increased to the level $\beta$ (step S14) at which there is no possibility that the vehicle may be stopped due to slippage of the drive wheels 18, 20, the transmission torque of the electromagnetic clutch 12 is gradually increased again (step S15). Hence, the present embodiment is very effective in starting the vehicle on a road surface having a considerably low coefficient of friction, for example, on a frozen or sandy road. According to the conventional controlling apparatus, a high skill is required to accomplish an intricate or sophisticated manipulation of the accelerator or clutch pedal, when the vehicle is started on a road surface with a very low coefficient of friction. If the driver does not have such a high operating skill, starting the vehicle is sometimes impossible. With the controlling apparatus which has been illustrated, the microcomputer replaces manipulations by the driver or operator of the vehicle, in adjusting the transmission torque of the electromagnetic clutch 12. Thus, the apparatus frees the driver from otherwise required intricate manipulation by the driver for adjusting the transmission torque. Thus, the instant control apparatus or method enables the vehicle to be easily started on a slippery or sandy road surface.

If the driver depresses the accelerator pedal (opens the throttle valve) by an excessive amount when starting the vehicle on a very slippery road surface, the engine might race due to the detection of a slip of the wheels (step S12) and subsequent disengagement of the clutch 12 (step S17). In this case, the driver will reduce the amount of depression of the accelerator pedal, and eventually the throttle valve opening is set near a level at which the drive wheels start to slip. In this situation, wherein the throttle opening is held almost constant, the present control apparatus operates to control the transmission torque for starting the vehicle while preventing the slippage of the drive wheels. As long as the throttle valve opening is almost constant, the control voltage Vcl for the clutch 12 is controlled by the present control apparatus, for adjusting the transmission torque so as to avoid the slippage of the wheels and the racing of the engine. As soon as the absence of the slip is detected, the control voltage Vcl is increased to increase the transmission torque, before an increase in the engine speed due to the disengagement of the clutch 12 amounts to a level at which the driver can perceive the engine speed increase as an engine racing and starts to reduce the throttle valve opening. In this connection, it is noted that the steps in the flow chart of FIG. 4(a) are repeated with a cycle time short enough to avoid the presence of a wheel slip for a time long enough to permit the driver to perceive the slip.

While the present invention has been described in its preferred embodiment with a certain degree of particularity referring to the accompanying drawings, it is to be understood that the invention is not confined to the precise disclosure of the illustrated embodiment, but may be otherwise embodied.

For example, while the illustrated embodiment detects a slip of the drive wheels 18, 20 based on a rate of variation in the rotating speed Nout of the output shaft 74 of the transmission 14, it is possible to detect the slip of the drive wheels 18, 20 by detecting a difference in the rotating speed between the drive wheels 18, 20 and non-drive wheels (driven wheels), based on a signal from a speed sensor for sensing the speed of the non-drive wheels, and the ROTATION signal SR2 from speed sensor 78 for the drive wheels 18, 20. Further, the slip detection of the drive wheels 18, 20 is possible by using an ultrasonic speed sensor which detects a ground speed, and detecting a difference between the detected ground speed and the vehicle speed indicated by the speed of the drive wheels 18, 20.

Although the illustrated embodiment used the ROAD-CONDITION designator switch 80 which is placed in the anti-slip control position when the road surface has a low coefficient of friction, this switch 80 may be replaced by a photoelectric device which includes a light source to emit a beam of light toward a road surface and a sensor to receive the reflected light beam to automatically detect a frozen, sandy or other slipperly condition of the road surface. The designator switch 80 or the photoelectric device serves as means for finding that a road surface on which the vehicle is started or driven has a low coefficient of friction.

It will be obvious that other changes, modifications and improvements may occur to those skilled in the art within the scope of the invention defined in the appended claims.

What is claimed is:

1. A method of controlling a clutch means having an electromagnetic coil which is incorporated in a power transmission system of a vehicle for transmitting a torque of an engine to drive wheels when the vehicle is started on a road surface having a low coefficient of friction wherein a transmission torque, transmitted by said clutch means, is varied with an electric current or voltage applied to said electromagnetic coil, said method comprising the steps of:

checking if a throttle valve of said engine is open and, increasing progressively a transmission torque which is transmitted by said clutch means, if said throttle valve is open;

designating whether a road surface on which the vehicle is driven has a low coefficient of friction by actuating a switch to indicate the low coefficient of friction of the road surface;

detecing a slip of said drive wheels on said road surface; and upon detection of the slip of the drive wheels while the road surface is designated as having a low coefficient of friction by actuation of said switch, reducing said transmission torque of the clutch means until the drive wheels have ceased to slip on said road surface.

2. An apparatus for controlling a clutch means which is incorporated in a power transmission system of a vehicle said clutch means having an electromagnetic coil, for transmitting an output of an engine to drive wheels, wherein a transmission torque transmitted by said clutch means is varied with an electric current or voltage applied to said electromagnetic coil said apparatus comprising:

road-condition designating means for indicating that a road surface on which the vehicle is driven has a low coefficient of friction comprising a switch which is actuated to indicate the low coefficient of friction of the road surface;

slip-detecing means for detecting a slip of said drive wheels on said road surface;

means for checking if said road-condition designating means indicates that the road surface has a low coefficient of friction;

means for checking if a throttle valve of said engine is open; and control means for increasing progressively said electric current or voltage if said throttle valve is open, and for reducing progressively said electric current or voltage in response to said slip detected by said slip detecting means while said road-condition designating means indicates by actuation of said switch that the road surface has a low coefficient of friction, said electric current or voltage being reduced until said drive wheels have ceased to slip on the road surface.

3. A method of controlling a clutch means having an electromagnetic coil, which is incorporated in a power transmission system of a vehicle for transmitting a torque of an engine to drive wheels when the vehicle is started on a road surface having a low coefficient of friction wherein a transmission torque, transmitted by said clutch means, is varied with an electric current or voltage applied to said electromagnetic coil, said method comprising the steps of:

checking if a throttle valve of said engine is open and, increasing progressively a transmission torque which is transmitted by said clutch means, if said throttle valve is open;

designating a road surface on which the vehicle is driven as having a low coefficient of friction by actuating a switch to indicate the low coefficient of friction of the road surface;

detecting a slip of said drive wheels on said road surface by determining that an acceleration of the drive wheels exceeds a predetermined value; and upon detection of the slip of the drive wheels while the road surface is designated as having a low coefficient of friction by actuation of said switch, reducing said transmission torque of the clutch means until the drive wheels have ceased to slip on said road surface.

4. An apparatus for controlling a clutch means having an electromagnetic coil, which is incorporated in a power transmission system of a vehicle, for transmitting a torque of an engine to drive wheels, wherein a transmission torque transmitted by said clutch means is varied with an electric current or voltage applied to said electromagnetic coil, said apparatus comprising:

road-condition designating means for indicating that a road surface on which the vehicle is driven has a low coefficient of friction comprising a switch which is actuated to indicate the low coeffilcient of friction of the road surface;

slip-detecting means for detecting a slip of said drive wheels on said road surface when an acceleration of said drive wheels exceeds a predetermined value;

means for checking if said road-condition designating means indicates that the road surface has a low coefficient of friction;

means for checking if a throttle valve of said engine is open; and control means for increasing progressively said electric current or voltage if said throttle valve is open, and for reducing progressively said electric current or voltage in response to said slip detected by said slip detecting means while said road-condition designating means indicates by actuation of said switch that the road surface has a low coefficient of friction, said electric current or voltage being reduced until said drive wheels have ceased to slip on the road surface.

5. An apparatus as claimed in claim 4, wherein said slip-detecting means comprises setting means for setting a time or angular interval sufficient for accurate detection of said acceleration of the drive wheels, means for calculating a variation in rotating speed of the drive wheels at said time or angular interval, and means for comparing said variation with a predetermined reference value.

6. An apparatus as claimed in claim 4, wherein said control means reduces said electric current or voltage at a rate lower than a rate at which the electric current or voltage is increased.

7. An apparatus as claimed in claim 4, further comprising means for detecting a running speed of the vehicle and comparing the detected running speed with a first predetermined value, means for detecting a current opening of said throttle valve of the engine and comparing the detected opening with a second predetermined value, and means for detecting a difference in rotating speed between an input shaft and an output shaft of the clutch means and comparing the detected difference with a third predetermined value, said control means increasing progressively said electric current or voltage, and reducing progressively said electric current or voltage until said drive wheels have ceased to slip on the road surface, provided that said detected running speed of the vehicle is lower than or equal to said first predetermined value, with the detected opening of the throttle valve greater than said second predetermined value, while said detected difference in rotating speed between the input and output shafts of the clutch is greater than said third predetermined value.

8. An apparatus for controlling a clutch means having an electromagnetic coil, which is incorporated in a power transmission system of a vehicle, for transmitting a torque of an engine to drive wheels, wherein a transmission torque transmitted by said clutch means is varied with an electric current or voltage applied to said electromagnetic coil, said apparatus comprising:

road-condition designating means for indicating that a road surface on which the vehicle is driven has a low coefficient of friction comprising a switch which is actuated to indicate the low coefficient of friction of the road surface;

slip-detecting means for detecting a slip of said drive wheels on said road surface when an acceleration of said drive wheels exceeds a predetermined value;

means for checking if a throttle valve of said engine is open;

control means for inceasing progressively said electric current or voltage if said throttle valve is open, and for reducing progressively said electric current or voltage in response to said slip detected by said slip detecting means while said road-condition designating means indicates by actuation of said switch that the road surface has a low coefficient of friction, said electric current or voltage being reduced until said drive wheels have ceased to slip on the road surface;

means for detecting a running speed of the vehicle and comparing the detected running speed with a first predetermined value, means for detecting a current opening of said throttle valve of the engine and comparing the detected opening with a second predetermined value, and means for detecting a difference in rotating speed between an input shaft and an output shaft of the clutch means and comparing the detected difference with a third predetermined value;

said control means increasing progressively said electric current or voltage until said drive wheels have ceased to slip on the road surface, provided that said detected running speed of the vehicle is lower than or equal to said first predetermined value, with the detected opening of the throttle valve greater than said second predetermined value, while said detected difference in rotating speed between the input and output shafts of the clutch is greater than said third predetermined value.

* * * * *